Figure 1:
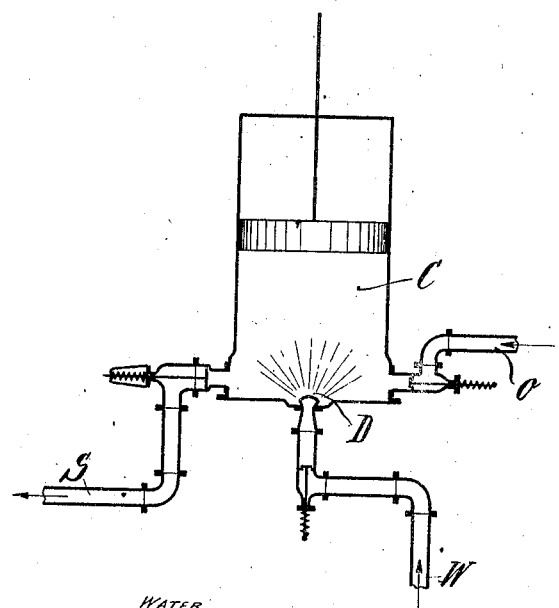

C. KNIPS.
PROCESS OF PROTECTING PUMPS FROM OZONE.
APPLICATION FILED JULY 18, 1911.

1,103,211. Patented July 14, 1914.

UNITED STATES PATENT OFFICE.

CHRISTOPH KNIPS, OF CHARLOTTENBURG, GERMANY, ASSIGNOR TO SIEMENS & HALSKE AKTIENGESELLSCHAFT, OF BERLIN, GERMANY, A CORPORATION OF GERMANY.

PROCESS OF PROTECTING PUMPS FROM OZONE.

1,103,211.  Specification of Letters Patent.  Patented July 14, 1914.

Application filed July 18, 1911. Serial No. 639,177.

*To all whom it may concern:*

Be it known that I, CHRISTOPH KNIPS, a subject of the German Emperor, and residing at Charlottenburg, near Berlin, Germany, have invented a certain new and useful Improved Process of Protecting Pumps from Ozone, of which the following is a specification.

The present invention relates to the protection of pumps, compressors and the like from the corrosive action of ozone, in processes which employ these devices for supplying ozone or ozonized air to the sterilization apparatus.

Water is frequently ozonized by the mixture of ozone and air being forced by means of injectors or compressors from the ozone generator into a sterilization tower or the like traversed by the water to be treated. In general, injectors operate less favorably than compressors; in addition, the employment of the same is connected with various disadvantages because the conveyance of the air is completely dependent on the flow of water, whereas working with compressors both admits of the employment of any desired quantities of air and also enables the ozone apparatus to be started independently of the time when the water flows. The hitherto customary ozonizing process employing compressors has, however, the disadvantage that the metal parts corrode owing to the direct action of the mixture of ozone and air, such corrosive action being due in part to the oxidizing property of ozone and in part to defective greasing, because the oil becomes resinified under the action of the ozone. In addition, the oil is vaporized in consequence of the heat of compression, and part of the vapors passes together with the mixture of ozone and air into the water to be ozonized. This defect is, of course, particularly serious in the ozonization of drinking water. Now a primary object of my invention is to provide a process of ozonizing water to which these defects are not attached.

My improved process consists in supplying small quantities of water with the mixture of ozone and air to the pump or the like while it is sucking in the mixture, such quantities not only being sufficient for preventing the inner metal parts of the pump being oxidized, but also rendering unnecessary the employment of special lubricating agents such as oil. The pump sucks in this quantity of water preferably simultaneously with the mixture of ozone and air coming from the ozone apparatus and forces the mixture consisting of ozone, air and a small quantity of water into the sterilizing tower or the like, into which the water to be sterilized is introduced and where the real ozonization of the water is to take place. In order to obtain in the pump as fine a distribution of the water as possible in the current of gas and to moisten the metal surfaces as completely as possible I prefer to introduce the water through spray-nozzles.

One form of apparatus suitable for carrying my process into practice is diagrammatically represented by way of example in the accompanying drawing.

Figure 2:
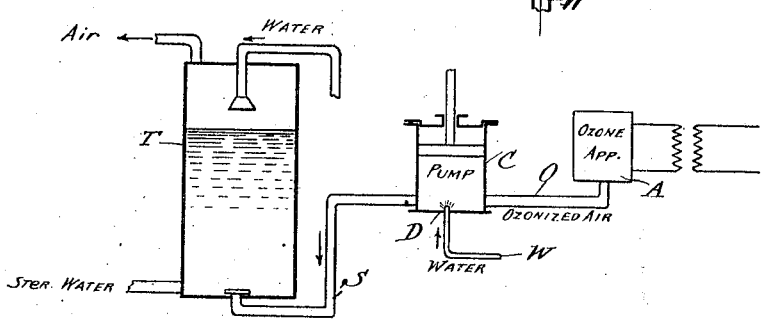

Figure 1 is a sectional elevation of the compressor, and Fig. 2 is a sectional diagram in elevation of the complete apparatus comprising the ozone supply, the pump and the sterilizing tower.

Referring to the drawing, the compressor C sucks in the mixture of ozone and air by way of the pipe O from the ozone apparatus A. Simultaneously, the compressor has supplied to it through the pipe W small quantities of water which are finely divided by spray-nozzles D. The mixture of ozone, air and water is forced through the pipe S into the sterilization tower T.

In the process forming the subject-matter of this invention on the one hand oxidation of the metallic parts of the apparatus is prevented owing to the parts being covered with a film of water and thereby protected from the direct action of the ozone, and on the other hand both corrosion owing to resinified lubricating oil, and the occurrence of particles of oil in the form of vapor in the drinking-water are impossible, because greasing with oil is entirely done away with. An additional advantage of my process is that the compressed air cooled by the injected water is cooled more than when compressors cooled by water-jackets are employed; this circumstance is of special importance in the treatment of drinking-water because in this case rises of temperature must be avoided as much as possible.

I claim:—

1. The method of protecting the interior of a pump from the corrosive action of ozone, consisting in supplying a small quantity of water to the pump or the like, while the pump is sucking in the ozonized air, the said quantity of water being sufficient for avoiding both oxidation of the inner metal parts of the pump or the like, owing to the influence of the ozone, and the employment of special greasing agents.

2. The method of protecting the interior of a pump from the corrosive action of ozone, consisting in supplying a small quantity of water to the pump or the like approximately simultaneously as it is sucking in the ozonized air, the said quantity of water being sufficient for avoiding both oxidation of the inner metal parts of the pump or the like owing to the influence of the ozone, and the employment of special greasing agents.

3. The method of protecting the interior of a pump from the corrosive action of ozone, which comprises sucking in ozonized air from the ozone generator, supplying a small quantity of water to the pump or the like while it is sucking in the ozonized air, the said quantity of water being sufficient for avoiding oxidation of the inner metal parts of the pump or the like, owing to the influence of the ozone, and forcing the ozonized air and this small quantity of water into the water to be sterilized.

4. The method of protecting the interior of a pump from the corrosive action of ozone, which comprises sucking in ozonized air from the ozone generator, supplying a small quantity of water to the pump or the like, simultaneously while it is sucking in the ozonized air, the said quantity of water being sufficient for avoiding oxidation of the inner metal parts of the pump or the like, owing to the influence of the ozone, and forcing the ozonized air and this small quantity of water into the water to be sterilized.

In testimony whereof I sign my name to this specification in the presence of two witnesses.

CHRISTOPH KNIPS.

Witnesses:
HENRY HASPER,
WOLDEMAR HAUPT.